March 16, 1926.

J. M. STRULLY 1,576,557

X-RAY FILM VIEWING STAND FOR SURGEONS

Filed Feb. 11, 1925 2 Sheets-Sheet 1

INVENTOR
Jacques M. Strully,
BY
Frantzef and Richards
ATTORNEYS

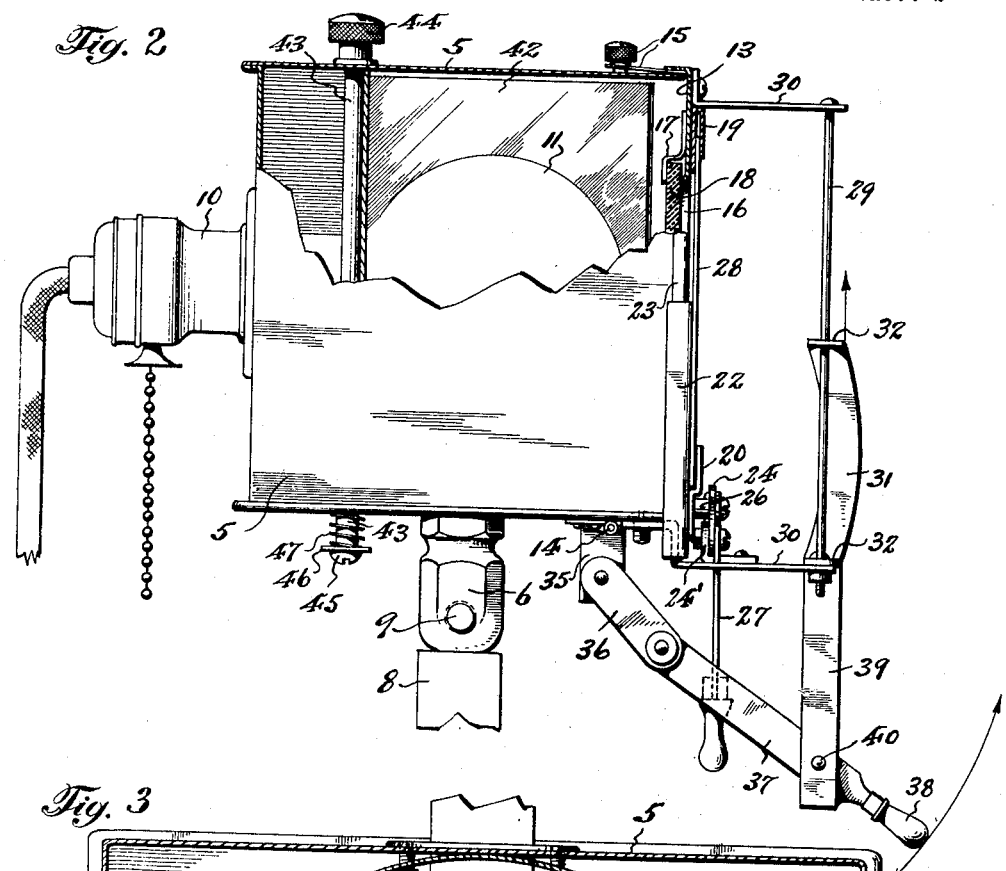
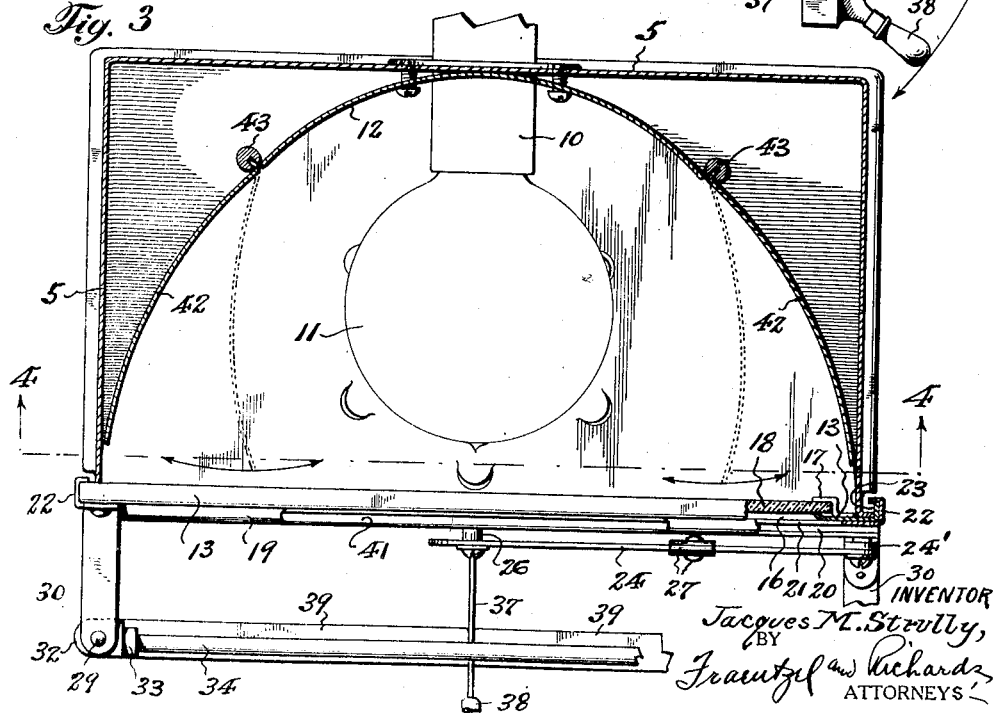

Patented Mar. 16, 1926.

1,576,557

UNITED STATES PATENT OFFICE.

JACQUES M. STRULLY, OF BROOKLYN, NEW YORK.

X-RAY-FILM VIEWING STAND FOR SURGEONS.

Application filed February 11, 1925. Serial No. 8,381.

*To all whom it may concern:*

Be it known that I, JACQUES M. STRULLY, a citizen of the United States, residing at Brooklyn, in the county of Kings and State of New York, have invented certain new and useful Improvements in X-Ray-Film Viewing Stands for Surgeons; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to an X-ray film viewing stand for surgeons' use; and the invention has reference, more particularly, to a novel means for supporting, illuminating and magnifying X-ray and other photographic films, as an aid to surgeons in performing operations to which the subjects of the films are related.

The invention has for its principal object to provide a convenient, compact and simple display stand by means of which X-ray and other photographic films, related to the condition of a patient, may be positioned adjacent to an operating table or chair, and by means of which said films may be illuminated, and if desired magnified, so as to be easily within the view of an operating general surgeon or dental surgeon, so that convenient reference may be made thereto while performing an operation.

Other objects of this invention, not at this time more particularly enumerated, will be clearly understood from the following detailed description of the same.

With the objects of this invention in view, the same consists, primarily, in a film viewing stand for surgeons hereinafter set forth; and the invention consists, furthermore, in the novel arrangements and combinations of the various devices and parts, as well as in the details of the construction of said parts, all of which will be hereinafter more fully described in the following specification, and then finally embodied in the claims appended thereto.

The invention is clearly illustrated in the accompanying drawings, in which:—

Figure 1:
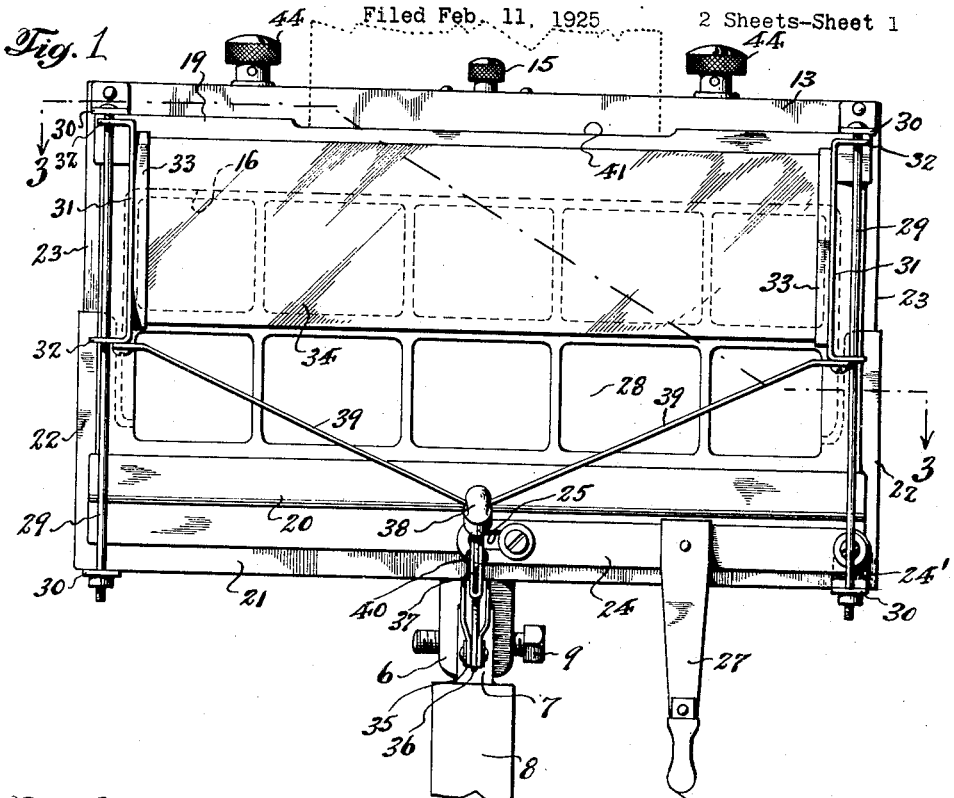
Figure 4:
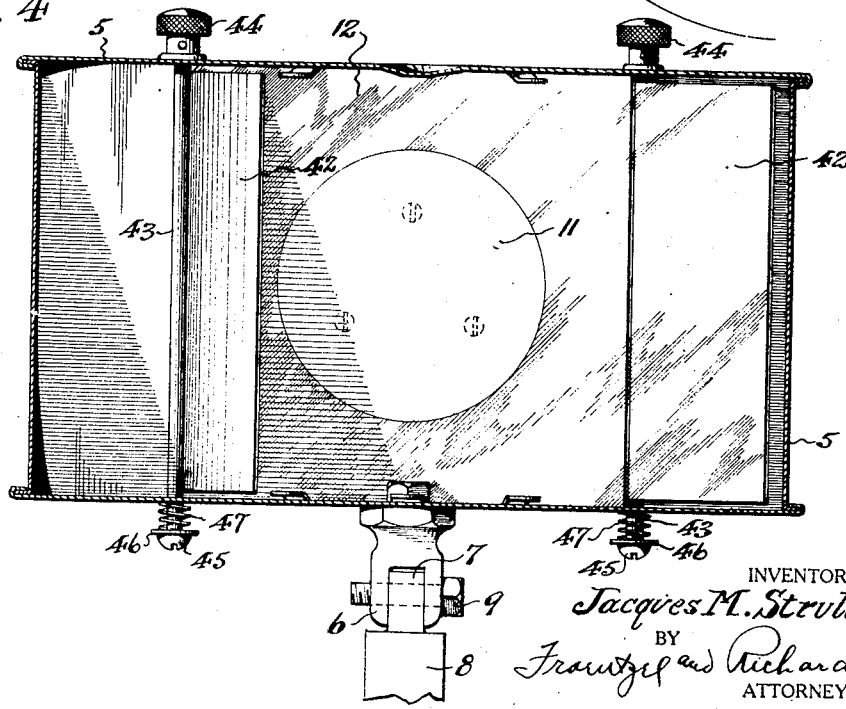

Figure 1 is a front elevation of the novel viewing stand, made according to and embodying the principles of this invention; Figure 2 is a part side elevation and part longitudinal vertical section of the same; Figure 3 is a horizontal section, taken on line 3—3 in Figure 1; and Figure 4 is a transverse vertical section, taken on line 4—4 in Figure 3.

Similar characters of reference are employed in all of the hereinabove described views, to indicate corresponding parts.

Referring now to said drawings, the reference character 5 indicates a suitable casing or housing, provided in connection with its underside with a knuckle 6, which is connected with a perforate lug 7 on the upper end of an upright supporting column or standard 8 of any suitable construction, to thus pivotally mount said casing or housing on the column or standard, subject to tipping or angular adjustment. The cooperating knuckle 6 and lug 7 are connected by a lock-screw 9 for frictionally locking the parts in desired positions of adjustment.

Secured in connection with the rear wall of said casing or housing 5, preferably in a central location, is an electric lamp socket 10, for mounting within the interior of the casing or housing an electric incandescent lamp 11, which is adapted to provide a source of illumination. Secured to the rear wall of said casing or housing, within its interior, and so as to be disposed behind the lamp 11, is a stationary reflector member 12 of arcuate shape.

The front wall 13 of said casing or housing 5 is preferably a separate member connected to the body of the housing or casing by hinges 14, so that the same may be swung downward to open the housing or casing, to thereby give access to the interior thereof for the insertion or replacement of the lamp 11, when need arises. Said front wall 13 is retained in normal closed relation to the housing or casing 5 by means of any suitable form of catch or latch device 15. Said front wall 13 of the casing or housing 5 is provided with an opening 16 of suitable shape and size. Secured by retaining chips 17, in position to cover said opening 16, is a translucent light diffusing screen 18, preferably made of ground glass. Fixed upon the exterior side of said front wall 13 is a longitudinal film receiving slideway, consisting of an upper stationary channeled or grooved member 19, which is secured above and parallel to said opening 16; and a lower vertically adjustable longitudinal channeled or grooved member 20, which is slidably connected with the front wall 13 for movement toward or away from said stationary member 19. The means for slidably mounting said member 20 for desired adjustment, comprises a carrier plate 21 upon which said member 20 is suitably fixed. Said carrier plate 21 is provided at its ends with vertical slide pieces 22, which embrace and slide upon guide-ribs 23 formed in connection with the vertical margins of said front wall 13 of said casing or housing 5, all in such manner that said carrier plate may be slid up and down across the outer face of said front wall 13, and toward and away from the stationary channeled or grooved member 19. A suitable means for actuating the carrier plate 21 is provided. One form of actuating means suitable for the purpose is illustrated in the accompanying drawings, and consists of a lever 24 (see Fig. 1) fulcrumed or pivoted at one end to extend abreast of the carrier plate 21. The free end of said lever 24 is provided with a slot 25, which is engaged with a lift-stud 26 which projects outwardly from said carrier plate. Secured to and depending from said lever 24 is a handle member 27 for manipulating the same. The upper and lower members 19 and 20 are adjusted relative to the height of a film 28 to be supported thereby, this being done by swinging the lever 24 up or down to slide the carrier plate 21 with the member 20 to desired vertically spaced apart relation to the member 19, whereupon the upper and lower marginal portions of the film 28 are respectively engaged in the respective channels or grooves of said members 19 and 20, so that the film may be slid into operatively supported relation to the latter, and so as to be disposed in front of and across the light diffusing screen 18 covering the opening 16 of the front wall 13 of said casing or housing 5.

Adjustably supported in front of the film 28, as the same is operatively supported across the opening 16 of the casing or housing front wall 13, is a means for magnifying the illuminated images contained on the film 28. This magnifying means preferably consists of a pair of vertical guide rods 29, respectively disposed adjacent to each end of the casing or housing 5, and supported in outwardly off-set or spaced relation to the front wall 13 by means of brackets 30 which are secured to the latter part. Slidably related to said guide rods 29 for vertical movement thereon is a carrier frame, comprising slide pieces 31, having laterally and outwardly projecting ears 32 embracing said guide rods 29. Secured to the inner face of each slide piece 31 is a socket member 33. Supported to extend between said slide pieces 31, by engaging its respective ends in said respective socket members 33, is a lens or magnifying glass 34, which is thus disposed to extend across the face of the displayed film 28 in proper focus distance therefrom. By moving the carrier frame up and down a corresponding movement of the lens or magnifying glass 34 is accomplished, so that the latter may be operatively related to a desired section of the film which it is desired to view at any given time. The means for producing the desired adjusting movements of said carrier frame, consists of fulcrum lug 35 secured to the under forward side of the bottom of the casing or housing 5 so as to depend therefrom. Pivotally connected by one end with said fulcrum lug 35 is a link 36, to the outer free end of which is pivoted a lever 37 provided with a handle member 38 at its outer extremity. Secured to each slide piece 31, so as to extend toward said lever 37 is a frame strut 39. The inner ends of said frame struts 39 terminate respectively on each side of said lever 37, and are pivotally connected thereto by a cross-pin 40. Up and down swinging movements imparted to said lever 37 will in turn produce up and down sliding movements of said carrier frame and the lens or magnifying glass mounted thereon, so that the latter may be selectively positioned opposite that portion of the displayed film which it is desired to magnify and view.

If desired, the fulcrum for the lever 24 which actuates the adjustable portion of the film supporting devices, may be made in the form of an upstanding perforate lug 24', the base of which is supported upon and suitably secured to one of the lower brackets 30. The stationary upper channeled or grooved member 19 of the film supporting devices may be provided with a longitudinal open slot 41, thus permitting a film to be passed downwardly therethrough into supported engagement with the lower channeled or grooved member 20, so that relatively small films may be supported in upright position across the face of the opening 16 of the casing or housing front wall 13.

When, as in the last described arrangement and mounting of the film, or in any other arrangement of comparatively small film, the same does not extend across or cover the entire opening 16 of the casing or housing front wall 13, it is desirable to deflect the light rays from the lamp 11 so that the same issue only through such area of the diffusing screen 18 as is covered by the displayed small film, leaving the rest of the screen dark or unilluminated. To this end there is provided within the interior of the casing or housing 5, at each end of the stationary reflector member 12, an adjustable combined reflector and light reducing shutter 42. Each combined reflector and light reducing shutter 42 is fixed upon a rotary spindle 43, which extends vertically between and with its respective ends journaled in the top and bottom walls of said casing or housing 5. The upper exterior extremity of each spindle 43 has secured thereto a fingerpiece or knob 44. A frictional engagement of the lower end of each knob 44 with the top wall of the casing or housing 5 is provided for, so that the spindles 43 and combined reflectors and shutters mounted thereon do not turn too freely, but rather tend to remain normally in any position to which they are turned or adjusted. This friction is established by securing to the lower extremity of each spindle 43, by means of a screw 45 or other suitable fastening means, a seating washer 46, and then mounting around the exterior lower end of the spindle, intermediate the bottom wall of the casing or housing and said seating washer 46, a compression spring 47, the tension of which exerts a downward thrust on the spindle to thereby draw the bottom of the knob on its opposite end into frictional engagement with the top wall of the casing or housing 5. It will be readily understood from an inspection of Figures 3 and 4 of the drawings, that the respective combined reflectors, when in the open position shown in Figure 3, serve in conjunction with the stationary reflector member 12, to direct the light of the lamp 11 through the entire area of the screened opening 16 of the front wall 13, but that the same may be turned inward toward the lamp (as shown by dotted lines in Figure 3), to deflect the light rays from passing through portions of the screened opening 16 which it is desired should remain dark, while only permitting the light rays to illuminate that portion of said screened opening with which a small sized or narrow film may be registered.

When a film 28 is mounted in the supporting means, and the lamp 11 is turned on, the light is transmitted through the film so that the same is illuminated, after the manner of a transparency, whereby the images or pictures contained on the film are clearly displayed. The light rays are diffused by the screen 18 so that an evenly distributed and clear light is transmitted through the film. Assuming that the film contains an X-ray picture, showing some bodily condition of the patient, which a surgeon desires to operate for. The viewing stand is placed conveniently near the operating table or chair, so that as the surgeon performs the operation, he may at any time make reference to the displayed X-ray picture. The magnifying lens or glass 34 is adjusted so as to magnify such part of the film as it may be desired to enlarge, to thus more clearly visualize the picture even at a considerable distance. It will thus been apparent that the device provides a very simple but efficient and practical aid to surgeons, for the purposes stated.

The viewing stand affords a particularly convenient device for displaying a series of X-ray pictures of teeth, such as are provided to dental surgeons. Such dental X-ray films usually comprise a series of individual films suitably mounted in groups, so that the teeth of the upper jaw are shown in an upper row of films, and the teeth of the lower jaw are shown in a lower row of films. When the films so mounted and grouped are positioned in the film supporting means of the device, and illuminated, the stand is placed adjacent to the operating chair so as to be easily within the view of the dental surgeon as he works. The lens or magnifying glass may be adjusted relative to either the upper or lower row of films, so that all of the films of a given group may be enlarged to increase the visibility thereof. If reference to only a selected film or films of the group is desired, the combined reflector and light reducing shutters 42 may be adjusted so as to direct the light of the lamp 11 only upon the films desired, while the outlying films remain dark or unilluminated. The convenience of my novel viewing stand as an aid to dental surgeons will be readily understood from the above description.

I am aware that some changes may be made in the general arrangements and combinations of the various devices and parts, as well as in the details of the construction of the same, without departing from the scope of this invention as described in the foregoing specification, and as defined in the appended claims. Hence, I do not limit my invention to the exact arrangements and combinations of the devices and parts as set forth in the foregoing specification, nor do I confine myself to the exact details of the construction of said parts as illustrated in the accompanying drawings.

I claim:—

1. A device for displaying and illuminating X-ray and other photographic films, comprising a housing, a standard for supporting said housing, a source of light mounted within said housing, one wall of said housing having an opening therein, adjustable means on the exterior side of said wall for supporting a film across said opening, comprising a stationary channel member fixed to said wall, a vertically slidable carrier plate provided with a second channel member opposed to said stationary channel member, means on said wall for slidably supporting said carrier plate, and a means for actuating said carrier plate.

2. A device for displaying and illuminating X-ray and other photographic films, comprising a housing, a standard for supporting said housing, a source of light mounted within said housing, one wall of said housing having an opening therein, adjustable means on the exterior side of said wall for supporting a film across said opening, comprising a stationary channel member fixed to said wall, a vertically slidable carrier plate provided with a second channel member opposed to said stationary channel member, means on said wall for slidably supporting said carrier plate, and a means for actuating said carrier plate; and means supported in outwardly spaced relation to said opening and film supporting means for magnifying the images of a displayed film.

3. A device for displaying and illuminating X-ray and other photographic films, comprising a housing, a standard for supporting said housing, a source of light mounted within said housing, one wall of said housing having an opening therein, means on the exterior side of said wall for supporting a film across said opening, and adjustable means for magnifying the images of a displayed film, comprising vertical guide rods, means for supporting said guide rods in outwardly off-set relation to said housing wall and its opening, a carrier frame slidably mounted on said guide rods, a magnifying lens supported by said carrier frame in front of and outwardly spaced a desired focus distance from the film supported by said supporting means, and means for moving said carrier frame on said guide rods.

4. A device for displaying and illuminating X-ray and other photographic films, comprising a housing, a standard for supporting said housing, a source of light mounted within said housing, one wall of said housing having an opening therein; an adjustable means on the exterior side of said wall for supporting film across said opening, comprising a stationary channel member fixed to said wall, a vertically slidable carrier plate provided with a second channel member opposed to said stationary channel member, means on said wall for slidably supporting said carrier plate, and a lever means for actuating said carrier plate; and adjustable means for magnifying the images of a displayed film, comprising vertical guide rods, means for supporting said guide rods in outwardly off-set relation to said housing wall and its opening, a carrier frame slidably mounted on said guide rods, a magnifying lens supported by said carrier frame in front of and outwardly spaced a desired distance from a film supported by said supporting means, and means for moving said carrier frame on said guide rods.

5. A device for displaying and illuminating X-ray and other photographic films, comprising a housing, a standard for supporting said housing, a source of light mounted within said housing, one wall of said housing having an opening therein, a light reflecting means within said housing and related to said source of light so as to direct the light rays therefrom through said opening, a light diffusing screen mounted intermediate said light source and said opening, means on the exterior side of said wall for supporting film across said opening, and means for directing the light through desired areas of the supported film, comprising combined reflector and light reducing shutters pivotally mounted within said housing adjacent to each side of said light source and movable intermediate said light source and said opening to intercept light rays directed toward the latter, and means for adjusting said shutters.

6. A device for displaying and illuminating X-ray and other photographic films, comprising a housing, a standard for supporting said housing, a source of light mounted within said housing, one wall of said housing having an opening therein, a light reflecting means within said housing and related to said source of light so as to direct the light rays therefrom through said opening, a light diffusing screen mounted intermediate said light source and said opening, means on the exterior side of said wall for supporting film across said opening, and means for directing the light through desired areas of the supported film, comprising combined reflector and light reducing shutters pivotally mounted within said housing adjacent to each side of said light source and movable intermediate said light source and opening to intercept light rays directed toward the latter, and means for adjusting said shutters; and means supported in outwardly spaced relation to said opening and film supporting means for magnifying the images of a displayed film.

7. A device for displaying and illuminating X-ray and other photographic films, comprising a housing having an opening in its face, means for supporting a film across said opening, a source of light mounted within said housing; and means for directing the light through desired areas of the supported film, comprising combined reflector and light reducing shutters pivotally mounted within said housing adjacent to each side of said light source and movable intermediate said light source and said opening to intercept light rays directed toward the latter, and means for adjusting said shutters.

8. A device for displaying and illuminating X-ray and other photographic films, comprising a housing having an opening in its face, means for supporting a film across said opening, a source of light mounted within said housing; and means for directing the light through desired areas of the supported film, comprising combined reflector and light reducing shutters pivotally mounted within said housing adjacent to each side of said light source and movable intermediate said light source and said opening to intercept light rays directed toward the latter, and means for adjusting said shutters; and means supported in outwardly spaced relation to said opening and film supporting means for magnifying the images of a displayed film.

In testimony that I claim the invention set forth above I have hereunto set my hand this 6th day of February, 1925.

JACQUES M. STRULLY.